April 25, 1961 E. J. DOUGLAS 2,981,349
SHAKERS FOR PACKING MATERIAL IN CONTAINERS
Filed April 5, 1957 2 Sheets-Sheet 1

INVENTOR.
EDWIN J. DOUGLAS
BY
*Christie, Parker & Hale*
ATTORNEYS

April 25, 1961 E. J. DOUGLAS 2,981,349
SHAKERS FOR PACKING MATERIAL IN CONTAINERS
Filed April 5, 1957 2 Sheets—Sheet 2

INVENTOR.
EDWIN J. DOUGLAS
BY
Christie, Parker & Hale
ATTORNEYS

United States Patent Office 2,981,349
Patented Apr. 25, 1961

2,981,349

SHAKERS FOR PACKING MATERIAL IN CONTAINERS

Edwin J. Douglas, Whittier, Calif., assignor to H. L. Stoker Company, Claremont, Calif., a corporation of California Filed Apr. 5, 1957, Ser. No. 650,945

8 Claims. (Cl. 177—264)

This invention relates to shakers for use in packing material in containers. The shaker is particularly suitable for use with automatic bag packers.

It is common practice to package various types of finely divided solid material, such as cement, grain, flour, chemicals, and the like, in containers suitable for shipment to the consumer. It is desirable to control the weight and the size of such containers accurately so that the customer will receive exactly the amount of material which he pays for, and so that the container will be of uniform size and weight for shipping purposes.

Various types of packers have been devised for packing material in a container. Most such packers contain an automatic arrangement for controlling the weight of the material which is packed in the container. Some such packers have been provided with arrangements for shaking the container as it is being packed so as to cause the material in the container to pack uniformly and so as to minimize the amount of air which is entrapped by the material. Such shakers are ordinarily cumbersome and difficult to use. Also, they interfere with the operation of the weighing mechanism so that the weighing mechanism of such packers can not be employed at the same time that the shaking operation is taking place.

These difficulties are overcome in the present invention by the use of a reciprocating support means which is balanced statically and dynamically so that the reciprocating action does not cause the shaker to vibrate appreciably, and by causing the support means to reciprocate with a stroke and at a speed so that the hammering action of the reciprocating support means causes the lower end of the container to be suspended so that the container does not follow the full up and down movement of the support means. Such an arrangement does not interfere with the weighing action of an automatic packer even though the shaker is mounted on the weighing mechanism of the packer to serve in effect as the weighing platform. This is because the shaker does not vibrate appreciably since its reciprocating mechanism is balanced and because the container which is being filled is suspended by the reciprocating support member due to the stroke and the speed of movement of the support member.

In a preferred embodiment of the invention for use in packing bags, the support means comprises two portions which move up and down in opposite directions with respect to one another. The two portions of the support means are disposed side by side but spaced apart a short distance so as to provide a slot for accommodating the lower end of a bag which is to be packed. This spacing between the two portions of the support means permit the bag to fill out and pull upwardly slightly as it is being packed without disengaging the support means. Also, this action permits the entire weight of the bag to be supported by the reciprocating support means so that the shaking action does not damage the upper portion of the bag where the material is being introduced and so that the shaking action does not interfere with the operation of the weighing mechanism.

The invention is explained in detail with reference to the drawings, in which:

Fig. 1 illustrates a typical bag packer 10 for automatically packing material in a bag 12. By way of example, the bag packer may be the type which is disclosed in my copending application Serial No. 639,495 which was filed on February 11, 1956, or it may be the general type which is disclosed in Patent No. 2,548,075.

Figure 1:
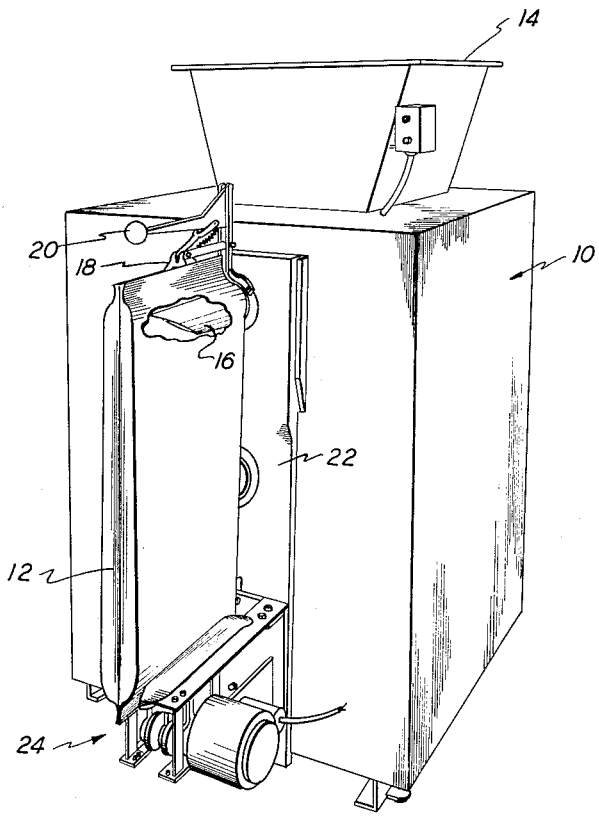
Fig. 1 is a perspective view of a preferred embodiment of the shaker mounted on an automatic bag packer.

The bag packer is provided with a hopper 14 for receiving material which is to be supplied through a spout 16 to the bag. A clamp 18 which is operated by a lever 20 serves to secure the bag to the filling spout. The filling spout is mounted on plate 22 which can move up and down and which is coupled to a weighing mechanism in the interior of the bag packer. This weighing mechanism may take various forms, such as the arrangement disclosed in the aforementioned patent or the arrangement disclosed in the aforementioned patent application. The weighing mechanism serves to stop the filling operation when the contents of the bag attain a certain weight, say some predetermined weight between 10 and 80 pounds.

The shaker of the present invention may be mounted directly on the weighing mechanism of such a bag packer without adversely affecting the automatic weighing function of the bag packer. In the embodiment which is illustrated in Fig. 1, the shaker 24 is mounted on the plate 22 which, in turn, is coupled to the weighing mechanism of the bag packer. The shaker comprises two support or pad members 26 and 28, as shown in detail in Figs. 3 and 4, which are disposed side by side and spaced apart a sufficient distance to accommodate the lower end of the bag which is to be filled. The shaker is located so that the pad members 26 and 28 are located below the filling spout a distance somewhat less than the length of the bag so that the bag will extend between the two pad members and engage them at all times during the filling operation. It is desirable that the upper surfaces of the pads slope toward one another so as to maintain the bag centrally located between them during operation of the shaker. It is desirable that the pads have downwardly sloped ends so that a bag can be removed from them by rolling it forward.

Figure 3:
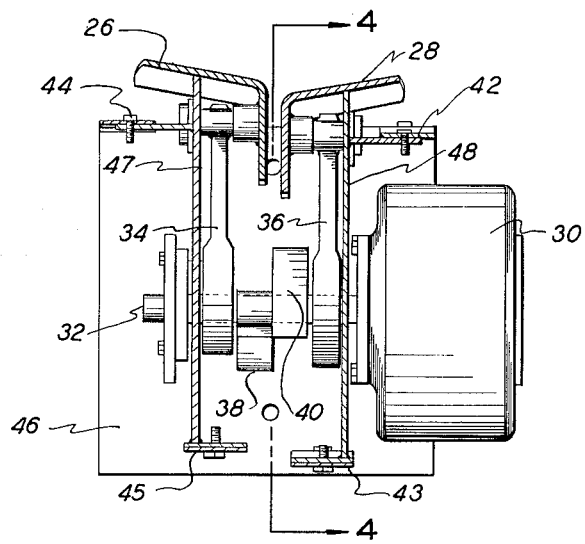
Fig. 3 is a sectional view showing the details of the shaker.
Figure 4:
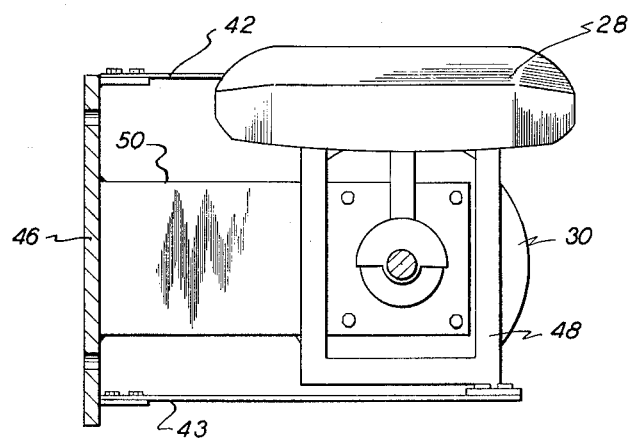
Fig. 4 is a sectional view along line 4—4 of Fig. 3.

The two pads are caused to move back and forth in a vertical direction with the pads moving in opposite directions with respect to one another. This movement is provided by an electric motor 30 through a crankshaft 32 and a pair of connecting rods 34 and 36. It is preferable to use double-sealed, self-lubricating ball bearings between the connecting rods and the crankshaft since it would be difficult to employ a conventional crankcase in this apparatus. Conventional bronze or nylon bearings may be employed at the other end of the connecting rods. A pair of balance weights 38 and 40 are provided on the crankshaft in order to balance the shaker assembly. The balance weights may be located between the connecting rods as shown in Fig. 3, or they may be located on the two ends of the crankshaft outside the space between the connecting rods, if desired.

The shaker assembly is balanced by employing the same formula and the same techniques as are employed for balancing automotive motors. It is preferable to achieve static balance in the assembly first, and then achieve dynamic balance by adjusting the balance weights 38 and 40, in accordance with conventional techniques. In calculating the size of the weights for achieving balance, the weight of the piston rods and the pads is employed in the same manner as the corresponding parts are employed in calculations for automotive motors. One half of the weight of the straps 42 through 45 is taken into consideration.

The straps 42 through 45 are affixed at one end to a rigid mounting plate 46. The other ends of the straps are connected to a pair of rigid frames 47 and 48 which support the pads. The straps and the frames form two parallelograms. The outer ends of the two parallelograms, and hence the pads, move up and down in response to the movements of the connecting rods so as to provide the desired reciprocating movement.

The electric motor is carried on a rigid plate 50 which, in turn, is affixed to the mounting plate 46.

Figure 2:
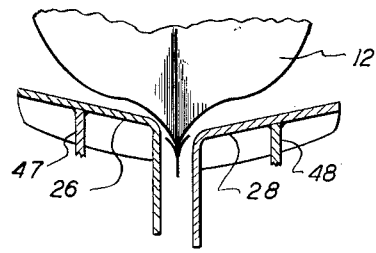
Fig. 2 is a fragmentary sectional view illustrating the relationship of the bag and the packer during the packing process.

It is preferable that the stroke and speed of movement of the pads be proportioned so that the hammering action of the pads on the lower end of the bag cause the lower end of the bag to be suspended in air and maintained at a generally fixed location so that the bag does not follow the full up and down movement of the pads, as illustrated in Fig. 2. This desired action is dependent both upon the stroke of the pads and on the speed of movement of the pads. If the stroke is increased, the speed may be decreased, and vice versa, within reasonable limits. Typical movement and speed for use in filling an 80 pound bag are a 5/16" stroke and a motor operating at 1200 r.p.m. A one-quarter horsepower motor is satisfactory for most operating conditions. It will be apparent that these operating conditions may be varied over a wide range. Also, it will be apparent that the shaker mechanism may be actuated by arrangements other than an electric motor, such as a V-belt drive from the bag packer.

In operation, a bag is inserted on the spout of the bag packer and part of the lower end of the bag is positioned in the space between the two shaker pads so that it extends below the pads. The bag packer is actuated to fill the bag, and the shaker is actuated to shake the contents of the bag and cause the contents to be packed uniformly. As the bag is packed, the material inside the bag causes it to fill out and pull upwardly somewhat. The distance between the pads of the shaker and the filling spout is such that the bag rides on the two pads throughout the filling operation. Since a portion of the bag extends below the pads in the space between the pads, the bag can pull upwardly as it fills out without disengaging the pads. The hammering action of the pads on the bag shakes the contents so that they pack uniformly. The hammering action also causes the bag to be suspended or "float" so that the bag does not follow the full up and down movement of the pads. The pads support the entire weight of the bag, and the bag may be weighed while it is being filled and while the shaker is operating. The bag packer may be arranged to stop automatically when the bag is of proper weight, and the filled bag may be removed by rolling it forward.

It is desirable that the distance between the filling spout and the pads be selected carefully so that the pads support substantially the entire weight of the bag and its contents throughout the packing operation. If an appreciable amount of the weight is supported by the spout, the weighing mechanism may not function properly and the upper end of the bag may tear.

Thus, by the use of a balanced shaking mechanism so that the shaker does not vibrate enough to affect the weighing mechanism appreciably and by operating the shaking mechanism so that the hammering action of the shaker suspends the container so that the container does not follow the full up and down movement of the shaker, it is possible to employ the shaker on the weighing mechanism of the bag packer. In effect, the shaker serves as the weighing platform since the weight of the bag which is being packed is supported by the shaker.

It is preferable to employ two pads which move in opposite directions with respect to one another in order to provide the shaking action. With such an arrangement, a bag does not tend to "walk" off of the shaking mechanism. Also, such a shaking arrangement provides both vertical and horizontal shaking movement. However, a balanced shaking mechanism may be constructed by causing both the pads to move in unison, or by employing a single shaking member. The latter arrangement is useful in shaking containers such as barrels. However, it is more difficult to balance a shaker employing a single shaking member or employing two shaking members which move in unison and, hence, it is preferable to employ two shaking members which move in opposite directions.

The shaker of the present invention has been described in conjunction with a typical bag packer having a horizontal spout for filling a bag and having an internal weighing mechanism for controlling the amount of material which is packed in the bag. There are many other types of packers and it will be apparent that the shaker of the present invention may be employed in conjunction with substantially any of the various types of packers.

By way of example, some packers employ a vertical filling spout, some employ a screw for conveying material to the container, some employ a mechanical impeller for transmitting material to the container, some employ a high speed belt which shoots material through a spout to the container, some employ a vacuum to draw material to the container, some introduce air into the material and cause it to flow into the container under the influence of gravity like a liquid, and some packers respond to the volume or density of material in the container, rather than the weight, to control the amount of material which is packed in the container.

The shaker of the present invention is particularly suitable for use with these various types of packers. However, the shaker is not limited to use in conjunction with a packer, and it may be employed separately or in conjunction with other types of machines.

I claim:

1. Apparatus for use in packing material in a container comprising a weighing mechanism, means for supporting the container on the weighing mechanism including a reciprocating support for supporting the lower end of the container, the reciprocating support being substantially balanced so that the reciprocating action does not cause the shaker to vibrate the weighing mechanism appreciably, and the support reciprocating a distance along the vertical direction and at a speed to cause the lower end of the container as it is being packed to be suspended so that the container does not follow the full up and down movement of the support.

2. The shaker of claim 1, wherein the support comprises two portions having reciprocating actions which are in opposite directions with respect to one another.

3. A bag packer which automatically weighs the contents of a bag comprising a weighing mechanism, means for supporting the bag on the weighing mechanism including a reciprocating support adapted to be located on the weighing mechanism of the bag packer for supporting the lower end of the bag, the support and the apparatus for causing it to reciprocate being balanced statically and dynamically so that the reciprocating action will not cause substantial vibration of the weighing mechanism, and the support reciprocating with a stroke and at a speed to provide a hammering action which causes the lower end of the bag to be suspended so that the lower end of the bag does not follow the full up and down movement of the support.

4. In combination with a bag packer having a horizontal spout for engaging the upper end of a bag to convey material to the interior of the bag and having a weighing mechanism for automatically weighing the contents of the bag, a shaker comprising two pad members disposed side by side and spaced apart a predetermined distance to accommodate the lower end of a bag, the pad members being located on the weighing mechanism of the bag packer and being located below the spout of the bag packer a distance slightly less than the length of the bag to be packed so that a bag located on the spout will extend into the space between the two pads, means for moving the pads back and forth in a vertical direction with the pad members moving in opposite directions with respect to one another so that the lower end of the bag can move upwardly in the space between the two pads as the bag is packed under the shaking action of the two pads, the pads having a stroke and moving at a speed to cause the lower end of the bag as it is packed to be suspended so that the bag does not follow the full up and down movement of the pads, thereby preventing damage to the upper end of the bag where it engages the spout of the bag packer, and the shaker being substantially balanced statically and dynamically so that the shaking action will not cause substantial vibration of the weighing mechanism, thereby permitting simultaneous use of the shaker and the automatic weighing mechanism.

5. The apparatus of claim 4, wherein the pads slope towards one another so as to maintain a bag centrally located between them during operation.

6. The apparatus of claim 4 wherein the pads have sloped ends so that a bag can be removed from the pads by rolling it forward.

7. A shaker for use in packing material in a container comprising two support members for engaging the lower end of the container disposed side by side, means for moving the support members back and forth in a vertical direction with the support members moving in opposite directions with respect to one another, the means for moving the support members being balanced so that the shaker does not vibrate excessively, and the two support members moving a distance and at a speed to provide a hammering action to cause the lower end of a container to be packed to be suspended so that the container does not follow the full up and down movement of the supports.

8. A shaker for use in packing material in a bag comprising two pad members disposed side by side and spaced apart a predetermined distance to accommodate the lower end of a bag, and means for moving the pads back and forth in a vertical direction with the pad members moving in opposite directions with respect to one another so that the lower end of a bag can move upwardly in the space between the two pads as the bag is packed under the shaking actions of the pads, the pads moving a distance and at a speed to cause the lower end of the bag as it is packed to be suspended so that the bag does not follow the full up and down movement of the pads, with the means for moving the pads being substantially balanced statically and dynamically so that the shaker does not vibrate excessively.

References Cited in the file of this patent

UNITED STATES PATENTS

| | | |
|---|---|---|
| 1,777,224 | Reuther | Sept. 30, 1930 |
| 1,852,376 | Rees | Apr. 5, 1932 |
| 2,010,220 | Cocks | Aug. 6, 1935 |
| 2,458,228 | Vredenburg | Jan. 4, 1949 |
| 2,548,222 | Kindseth | Apr. 10, 1951 |
| 2,757,894 | Kindseth | Aug. 7, 1956 |